June 30, 1942.     M. J. O'SULLIVAN     2,287,943
EDUCATIONAL DEVICE
Filed Feb. 2, 1940
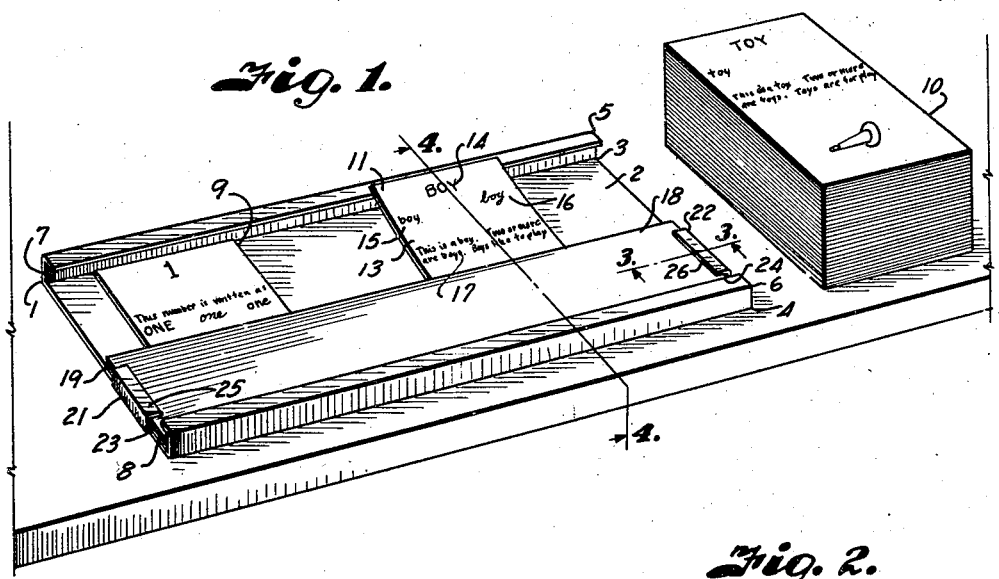
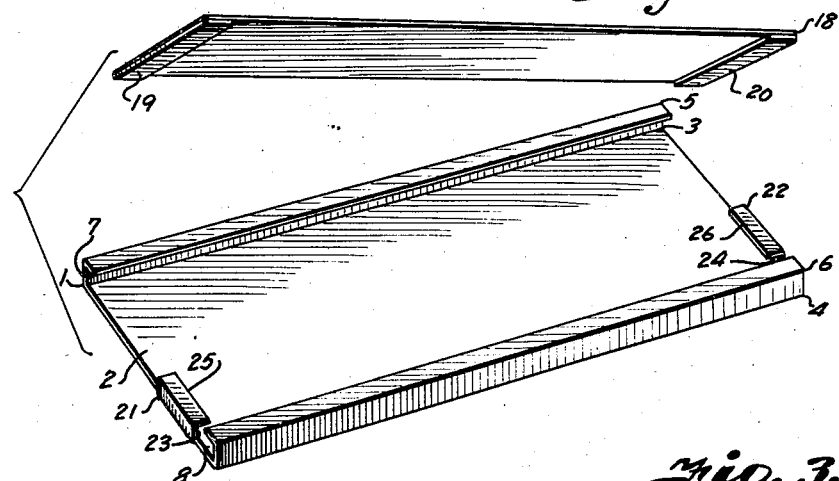
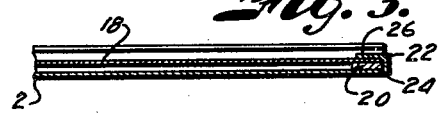
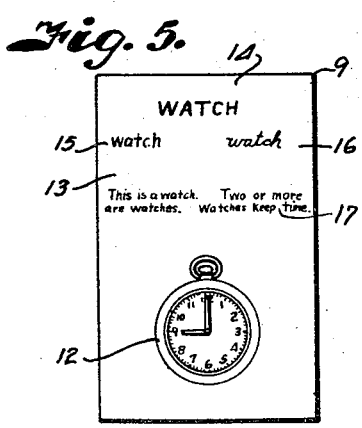
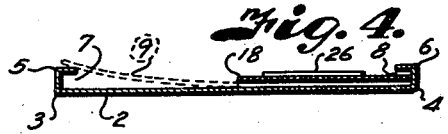
INVENTOR
Maurice J. O'Sullivan.
BY
Arthur C. Brown
ATTORNEY Patented June 30, 1942

2,287,943

UNITED STATES PATENT OFFICE 2,287,943

EDUCATIONAL DEVICE

Maurice J. O'Sullivan, Kansas City, Mo.

Application February 2, 1940, Serial No. 316,963

2 Claims. (Cl. 35—35)

This invention relates to elucational devices, and more particularly to devices of that character adaptable for instructing persons, especially children, in the correlation of objects to the names for such objects and/or the association of other pertinent information with such objects; the principal objects of the present invention being to provide efficient, convenient and economical educational devices for such purposes.

Other objects of the present invention are to provide educational devices that involve the elements of amusement, suspense and variety for increasing the enjoyment of operating the devices; to provide for instructing, testing and checking the accuracy of persons in the identification of intelligence related to given objects; and to provide improved elements and arrangements of such elements in educational devices having the noted characteristics.

In accomplishing these and other objects of the present invention, I have provided improved details of structure, the preferred forms of which are illustrated in the accompanying drawing, wherein:

Fig. 1 is a perspective view of an educational device embodying the preferred form of my invention, the display members being shown in a stack, and certain of the display members being shown in supported and semi-supported condition.

Fig. 2 is a perspective view of the support and mask for the display members, the same being shown in spaced disassembled relation.

Fig. 3 is a detail longitudinal section through the support and mask for the display members, substantially on the line 3—3, Fig. 1.

Fig. 4 is a detail transverse section through the support and mask for the display members substantially on the line 4—4, Fig. 1, and showing a display member in dotted lines.

Fig. 5 is a detail plan view of a display member.

Referring more in detail to the drawing:

1, Fig. 1, designates an educational device embodying the features of the present invention, which, in the present preferred instance, preferably consists of a plate 2, which may be formed of stamped or otherwise shaped sheet metal, the plate 2 preferably being generally rectangular in shape, and having its longitudinal edges bent forwardly, as at 3 and 4, and inwardly, at at 5 and 6, to form troughs 7 and 8.

9, Fig. 5, designates a display member, a stack of which is shown at 10 in Fig. 1. Other individual display members 11 are shown in supported and partially supported position, respectively, relative to the supporting plate 2, Fig. 1. Each display member preferably consists of a suitable body member, such as a card, block, or the like, preferably of playing card size, shape and material, which body is provided with one portion bearing a pictorial representation 12 of an object and another portion 13 bearing a representation of the object other than a pictorial representation. For example, as shown in Fig. 5, a watch may be the object, and a picture thereof is shown on the lower half of the card, whereas the name of the object, namely "watch" is preferably represented in upper case letters as at 14 on one line of the other portion of the card, and is preferably represented in lower case letters, as at 15, and script, as at 16. Other intelligence 17 may be interposed between the pictorial and written representations of the object on the face of the card.

The support 2 and display member 9 preferably have a related size and shape of such a character that, as shown in Fig. 1, a display member 11 may be inserted in the lower trough 8 and, if desired, in such a manner as to allow the upper portion of the display member to rest on the inwardly turned edge 5 of the plate to facilitate grasping the card for removal from the trough. The inwardly turned edge 5 of the plate is preferably of a length sufficient to allow the upper edge of a display member to be arranged therebelow, as indicated in connection with the display member 9, so that the display member may lie flat against the back of the plate and thus be substantially supported.

The support and display members being so provided and arranged, it is desirable to expose the whole card to instruct a child to recognize not only the pictorial representation of an object, but its name in writing or script. It is, further, desirable to test the child on the accuracy of his recognition of the written representation of the object, and, further, to check the noted test for accuracy. To this end, therefore, a mask or the like 18 is provided, which preferably consists of a plate of approximately the length of the plate 2 and preferably approximately half the width of the plate 2, whereby the mask may be laid in the trough 8 over the display members 11 and 12, for example, to cover the pictorial representations of the objects on the display members, as illustrated in Fig. 1.

In order to facilitate application and removal of the display members to the trough while the mask is in place in the trough, the mask is preferably provided at its ends with spacing elements 19 and 20, which may consist of suitable strips or, if desired, folded under ends of the mask. The mask is also substantially positively retained in position in the trough 8 on the support by fastening devices 21 and 22, which preferably form part of the plate 2, and which may be stamped at the time of stamping the plate and bent at the time of shaping the troughs to form guideways 23 and 24 for the ends of the mask, as well as clip fingers 25 and 26 engageable over the outer face of the mask, as shown in Fig. 1.

The operation of an educational device constructed and arranged as described is as follows:

Display members may be selected from the stack 10, Fig. 1, and placed in the trough 8 of the support 2 in the manner of the member 11. The supported display member may then be suitably arranged for observation by a child or other person, who thereupon can memorize the contents of the display member. To check the memory or recognition of the display member contents, the mask may then be slid into the trough 8 between the fastening devices 21 and 22 and the support in such a manner as to cover the pictorial representation on the display member, but exposing the text or other indicia on the display member related to the pictorial representation of the given object. If desired, the upper end of the display member may be pressed back of the edge 5 of the plate to position it, as in the manner of the display member 9, Fig. 1, for substantially positively retaining the display member on the support. The child may then observe the exposed text on the display member to determine whether or not the text is sufficiently associated in his mind with the pictorial representation as to correlate both text and picture.

When the child has named the pictured object after observation of the text, the mask may then be removed so that the instructor may show the child whether or not his correlation of text and picture is correct.

Other display members may then be substituted for the display members first used, and the playing members may be varied in contents with pictures and descriptions of common objects, toys or other devices and things suitable for holding the interest of the child or making for the enjoyment of operation of the device by the child being so instructed.

It is apparent, therefore, that the present invention provides an efficient, convenient and economical educational device that is interesting and varied in its embodiment and adaptable for instruction in the correlation of pictures of objects to intelligence pertinent to such objects.

What I claim and desire to secure by Letters Patent is:

1. An educational device comprising a holder having a flat base portion provided with opposed longitudinal edge portions turned upwardly and inwardly to provide a pair of inwardly facing opposed retaining channels adapted to receive the opposite ends of one or more interchangeable display members, a display member comprising a substantially flat rectangular sheet of resilient material of a length slightly greater than the distance between the extreme opposed edges of the channel, said member being adapted to have one transverse edge portion received within one of said channels and the other edge portion selectively received within the other channel or resting upon the edge thereof, a mask member substantially equal in length to the lenth of the base portion and of a width approximately equal to one-half the width of the latter, said mask member being adapted to have one longitudinal edge thereof received in said first mentioned channel and to overlie a portion of the display member and conceal the same, a pair of upwardly and inwardly turned ears carried at the transverse edges of the base portion adapted to overlie the transverse edges of the mask member to removably retain the same in position in the holder, and spacing strips secured to the underneath side of the mask member at the opposite side edges thereof and adapted to rest on the base portion of the latter to maintain the mask member slightly elevated from the base portion.

2. An educational device comprising a holder having a flat base portion provided with opposed longitudinal edge portions turned upwardly and inwardly to provide a pair of inwardly facing opposed retaining channels adapted to receive the opposite ends of one or more interchangeable display members, a display member comprising a substantially flat rectangular sheet of resilient material of a length slightly greater than the distance between the extreme opposed edges of the channel edges, said member being adapted to have one transverse edge portion received within one of said channels and the other edge portion selectively received within the other channel or resting upon the edge thereof, a mask member substantially equal in length to the length of the base portion and of a width approximately equal to one-half the width of the latter, said mask member being adapted to have one longitudinal edge thereof received in said first mentioned channel and to overlie a portion of the display member and conceal the same, and a pair of upwardly and inwardly turned ears carried at the transverse edges of the base portion adapted to overlie the transverse edges of the mask member to removably retain the same in position in the holder.

MAURICE J. O'SULLIVAN.